United States Patent [19]
Hata et al.

[11] Patent Number: 5,333,230
[45] Date of Patent: Jul. 26, 1994

[54] OPTICAL-FIBER CABLE INCORPORATED LONGER-SIZED SUBAQUEOUS UNIT

[75] Inventors: Ryosuke Hata; Masayuki Hirose, both of Osaka; Toshiyuki Amagai, deceased, late of Osaka, by Kenjo Amagai, Michiko Amagai, heirs; Masayoshi Yamaguchi; Hiroyuki Kimura, both of Osaka, all of Japan

[73] Assignee: Sumitomo Electric Industries, Ltd., Osaka, Japan

[21] Appl. No.: 127,090

[22] Filed: Sep. 27, 1993

Related U.S. Application Data

[63] Continuation of Ser. No. 41,882, Apr. 2, 1993, abandoned, which is a continuation of Ser. No. 581,705, Sep. 13, 1990, abandoned.

[30] Foreign Application Priority Data

| Sep. 13, 1989 | [JP] | Japan | 1-237740 |
| Sep. 14, 1989 | [JP] | Japan | 1-239333 |
| Nov. 1, 1989 | [JP] | Japan | 1-286764 |

[51] Int. Cl.$^5$ ............................................. G02B 6/44
[52] U.S. Cl. ...................................... 385/110; 385/111
[58] Field of Search ........................... 350/96.23, 96.24; 385/110, 111, 109, 101

[56] References Cited

U.S. PATENT DOCUMENTS

| 4,153,332 | 5/1979 | Longini | 385/111 |
| 4,389,088 | 6/1983 | Trezequet | 385/111 |
| 4,711,523 | 12/1987 | Iri et al. | 385/110 |
| 4,763,981 | 8/1988 | Wilkins | 385/101 |

FOREIGN PATENT DOCUMENTS

| 609915 | 8/1991 | Australia . |
| 165028 | 12/1985 | European Pat. Off. . |
| 0321262 | 6/1989 | European Pat. Off. . |
| 2052092 | 1/1981 | United Kingdom . |
| 2145556 | 3/1985 | United Kingdom . |

OTHER PUBLICATIONS

Fiber Optics Communication Lines, Textbook, Radio i Svyaz, Moscow, Jan. 1990, pp. 60 to 63 (Both Russian Text and Translation Thereof).
Wilkins, "Fiber Optic Telemetry in Ocean Cable Systems", Oceanographic Winch and Cable Handbook, Jan. 1986.
AmorTech Cables, Brochure and Price List, Aug. 1984.

*Primary Examiner*—Frank Gonzalez
*Assistant Examiner*—Stephen W. Barns
*Attorney, Agent, or Firm*—Cushman, Darby & Cushman

[57] ABSTRACT

An optical-fiber incorporated longer-sized subaqueous unit comprises optical fiber units arranged inside or outside a plastic sheath provided on the periphery of the core body of the longer-sized subaqueous unit such as power cable core or water supply tube. Each optical fiber unit includes an optical fiber accommodated in a metal pipe having on its periphery a coating layer made of plastic material with a melting point higher than that of the material of the plastic sheath, and armoring iron wire bundles are further provided outside the plastic sheath on the periphery of the core body, thereby preventing any buckling in the optical fiber units.

22 Claims, 3 Drawing Sheets

OPTICAL-FIBER CABLE INCORPORATED LONGER-SIZED SUBAQUEOUS UNIT

This is a continuation of application Ser. No. 08/041,882, filed on Apr. 2, 1993, which was abandoned upon the filing hereof, which is a continuation of Ser. No. 07/581,705, filed Sep. 13, 1990, now abandoned.

BACKGROUND OF THE INVENTION

1. Field of the Invention

This invention relates to an optical-fiber incorporated longer-sized subaqueous unit in which optical fibers are combined with a power cable, water supply tube, or the like to be laid down on the bottom of water.

2. Description of the Prior Art

A conventional counterpart of the invention, for example, an optical-fiber incorporated submarine power cable is constructed in such a manner that a plastic sheath made of polyethylene, vinyl chloride, or the like having on its periphery a spiral or lengthwise groove is provided on the periphery of a single-core or three-core cable, wherein an optical fiber is embedded into the groove and armoring iron wires are further provided outside the plastic sheath, or alternatively that an optical fiber cable is provided in the form of spiral or SZ strand on the periphery of a power cable, whereon a plastic sheath and, further outside thereof, armoring iron wires are provided. Commonly, in the case of a three-core cable, an optical fiber is inserted into idle spaces between the cable cores for composition.

However, the optical fiber is weak in mechanical strength in general, buckling being critical therefor. Moreover, local bending or so-called microbend causes the transmission characteristic of an optical fiber to be deteriorated remarkably.

In some cases where an optical fiber is limited in length due to the bobbin of a rolling device or the like so that the optical fiber cannot be combined with a power cable in a series of length, the optical fiber needs to be joined with another. Otherwise, when power cables are involved in factory joining, it is also required for optical fibers to be joined at the same time.

Thus, it is necessary to accommodate the joining margins on a power cable or all along within the groove on a plastic sheath with optical fibers having been joined and permitting the incorporation thereof without any microbend. This technique has been the largest bottleneck in manufacturing optical fiber units. That is, optical fibers, when joined, are required to be away from the power cable main body. The marginal portion for this purpose involves a most difficulty to be accommodated without deteriorating the performance of the optical fiber. Further, when a plurality of optical fibers are used, different margin lengths thereof will almost prohibit them from being accommodated.

SUMMARY OF THE INVENTION

It is therefore an object of the present invention to provide an optical-fiber incorporated longer-sized subaqueous unit having such a construction as described above, wherein the longer-sized subaqueous unit is so arranged as to prevent any buckling that would affect the optical fiber unit during the bending operation of the longer-sized subaqueous unit. The buckling here mentioned is critical for an optical fiber, while any local bending or so-called microbend causes an optical fiber to be deteriorated in its transmission characteristic.

Such an optical-fiber incorporated longer-sized subaqueous unit, designed to prevent any buckling therewith, has the following features.

The optical-fiber incorporated longer-sized subaqueous unit is characterized in that optical fiber units are arranged inside the plastic sheath provided on the periphery of the main body of the longer-sized subaqueous unit such as a power cable or water supply tube, each optical fiber unit including an optical fiber accommodated in a metal pipe having on its periphery a coating layer made of a plastic material with a melting point higher than that of the material of the above-mentioned plastic sheath, and armoring iron wire bundles are further provided outside thereof.

Such an arrangement of the longer-sized subaqueous unit enables the prevention of any buckling in the optical fiber units which would occur along with the bending of cable or water supply tube, thus allowing a stable performance of the longer-sized subaqueous unit to be retained over a prolonged period.

In the case of a submarine power cable, both the plastic sheath of the cable and the plastic coating layer of the optical fiber unit or only the plastic coating layer of the optical fiber unit may be of a semiconductive layer so that any abnormal induced potential due to an aggressive surge will be prevented from occurring in the metal pipe of the optical fiber unit, thus avoiding the possibility of the insulation destruction of the coating layer of the metal pipe.

Another object of the invention is to provide an optical-fiber incorporated longer-sized subaqueous unit permitting optical fibers to be simply joined, characterized in that an optical fiber unit including an optical fiber accommodated in metal pipe having a plastic coating layer on its periphery is wound on the outside of the plastic sheath provided on the periphery of a main body of a longer-sized subaqueous unit such as a power cable or water supply tube, and armoring iron wire bundles are further provided outside thereof.

Such an arrangement of the longer-sized subaqueous unit in which optical fiber units are interposed on the plastic sheath provided on the periphery of the main body of the longer-sized subaqueous unit enables optical fibers to be joined independently of any factory joining of the longer-sized subaqueous units, and further permits optical fibers solely to be joined irrespectively of joining excess length, margin, or rejoining from failure.

BRIEF DESCRIPTION OF THE DRAWINGS

FIGS. 7 (a) to (d) are all explanatory views for experiments with regard to the arrangement of optical fiber units;

DETAILED DESCRIPTION OF THE INVENTION

We inventors for the present application made a variety of trials and considerations in order to find out a construction of the optical-fiber incorporated longer-sized subaqueous unit having optical fiber units to be most simply incorporated with a main body such as a power cable core or a plastic water supply tube and yet to be free of any deterioration in the mechanical and transmission characteristics of the optical fiber.

With such an arrangement that 30 pieces of approximately 1.0 mm outer diameter metal pipes each having an optical fiber accommodated therein were wound on a lead sheath of an approximately 70 mm outer diameter power cable core in the form of spiral at pitches of 70 multiplied by 7 to 12, with polyethylene sheath provided thereon, when we subjected the units to 20 times of reciprocating bending at a radius of 70 mm×20=1400 mm and examined the optical fibers and metal sheaths, it was observed that several to 10 odd optical fiber units yielded any fracture. Hence, it was found that the metal pipe is weak in buckling strength and therefore low in stiffness as primarily accounting for the above result.

For this reason, we additionally provided a polyethylene coating layer on the periphery of a metal pipe as a reinforcement therefor. Since an excessively thick polyethylene coating layer will cause an excessively large outer diameter of the metal pipe and undesirably make the stage gaps of the optical fiber units externally apparent when a polyethylene sheath is provided on the arrangement layer of the optical fiber units, the thickness of the polyethylene coating layer was designed to be 0.5 to 1.0 mm, the outer diameter of an optical fiber unit being 2 to 3 mm. Then, as shown in FIGS. 7 (a) to (d), we fabricated prototypes of the optical fiber incorporated units in two types, one having only optical fiber units (3) wound thereon and the other having both optical fiber units (3) and nylon string spacers (4) wound together and further polyethylene sheath provided thereon.

We subjected such products to bending tests and thereafter dismantled for examination. The following are findings thus obtained.

(1) The polyethylene coating layer of the optical fiber units proved to have partly fused out or deformed due to the extrusion temperature of the polyethylene sheath (where in general polyethylene has a melting point of 120° to 130° C. and is extruded as a coating layer at around 200° C.), not serving as an effective reinforcement;

(2) The cases of FIGS. 7 (c) and (d) showed relatively desirable results with comparatively less effect as in the preceding item (1), whereas some optical fiber units 3 were involved in the occurrence of aforementioned buckling, proving to be still insufficient in reinforcement and so in stiffness to obtain stable products in mass production;

(3) In contrast between the sparse winding as in FIGS. 7 (a) and (b) and the dense winding as in FIGS. 7 (c) and (d), it proved that the dense winding shows more uniform movement of the optical fiber units 3 against the bending, further suppressing the occurrence of local buckling; and (4) The nylon string spacers 4 did not show any abnormalities.

In view of these results, we reached a conclusion that as the coating layer on a metal pipe for optical fibers it is most desirable to use a plastic material having a higher melting point and higher stiffness than those of polyethylene used as the plastic sheath for the power cable core. Then, in FIGS. 7 (a) to (d), we performed like experiments with the polyethylene coating layer on a metal pipe of the optical fiber units 3 replaced by a nylon coating layer.

It was found that any arrangement shown in FIGS. 7 (a) to (d) shows a satisfactory result. Further looking into the difference among (a) to (d) proved that the arrangements of (c) and (d) are here also superior to others and that, when the cables were further subjected to the exercise of transverse stress and crashing, the arrangements of (c) and (d) are still superior. Performing like experiments with other materials such as polybutene, polypropylene, and FRP, the results were the same as with nylon. In particular, FRP proved to be superior as high in mechanical strength and good in stiffness characteristic.

Subsequently, we performed like bending tests as above with armoring iron wires provided on the polyethylene sheath, whereas the foregoing conclusions remained unchanged.

Based on the results obtained heretofore, we performed further experiments with the optical fiber units wound on the polyethylene sheath for the power cable. In this experiment, the thickness of the coating layer of the optical fiber unit was 0.5 to 1.0 mm and the outer diameter of the optical fiber unit was 2 to 4 mm. In this case, in addition to prototypes with the sparse winding shown in FIGS. 7 (a) and (b), we fabricated those of the dense winding structure shown in FIGS. 7 (c) and (d) in which nylon string spacers were added to the optical fiber units. It seemed that the dense winding with armoring iron wires provided thereon would be subject to less biased load of the external force from the armoring iron wires and moreover less local bending or movement in the optical fiber units, thus preferably suppressing the occurrence of any local abnormalities.

In the case of FIG. 7 (c), when the diameter of an optical fiber is within the range of 2 to 4 mm, the outer diameter of a nylon string spacer was 3 to 6 mm, increased by 1 to 2 mm. In another case of FIG. 7 (d), both the diameters of optical fiber units and nylon string spacers were of a kind, 2 to 4 mm. In both cases, the winding pitches were made 7 to 12 times larger than lower diameters of the concentrated portions of the optical fiber units, and thereon a winding layer of polypropylene yarn as a seat, a single armoring iron wire having an outer diameter of 8 mm, and a serving layer of polypropylene yarn were provided, like a conventional technology for submarine cables.

We subjected such cables to 20 times of reciprocating bending at a radius of 20 times the outer diameter of the armoring wire, looking into the degree of damage in the optical fiber units. Then, every arrangement proved to be more or less sound but, more precisely, the structure of dense winding showed more stable and better results as expected.

Subsequent to this, we exercised transverse stress and crashing for examining the yield strength of optical fiber units. The result was that although both arrangements had sufficient performance, the arrangement of FIG. 7 (c) showed a higher yield strength of optical fiber units since its pressure was shared with nylon string spacers to a higher amount than in the arrangement of FIG. 7 (d), thus the arrangement of FIG. 7 (c) being preferable in cases where lateral pressure is greater. In other cases where the lateral pressure performance is not involved, however, it is preferable to have the same diameter in both optical fiber units and nylon string spacers as shown in FIG. 7 (d), facilitating the production and reducing the number of winding units as much as possible, with increased productivity. Further, in such a case where the lateral pressure performance may be low, even both the arrangements of FIGS. 7 (a) and (b) will do and contribute to economy. These variations can be selected depending on working conditions.

In addition, the coating material applied onto the serving layer of polypropylene yarn as an outmost layer proved to have no effect on the nylon, polybutene, and-polypropylene as plastic coating layers for optical fiber units.

Furthermore, the cables having such arrangements would be subject to penetration of sea water or the like through armoring wires up to optical fiber units. As to the resistance against the sea water, although polyethylene has been most widely used and proven to involve no problems, nylon, polybutene, and polypropylene also have been verified to be successful in the long-time immersion elongation and rupture stress lowering tests. However, there are some cases where polyethylene is preferable to nylon in the environment in the vicinity of sea water surface involving effect of ultraviolet rays, wetting due to sea water, and repeated drying. In such a case, it is desirable to apply an additional coating layer of polyethylene with a thickness of approximately 0.5 to 2.0 mm outside the nylon coating layer in addition to the coating layers of the nylon string spacers and optical fiber units.

In both the arrangements described above, the method of winding optical fiber units and nylon strings may be SZ strand, equivalent to the spiral winding in essence, whereas the spiral winding method is preferable to that of SZ strand in view of production facilitation.

Figure 1:
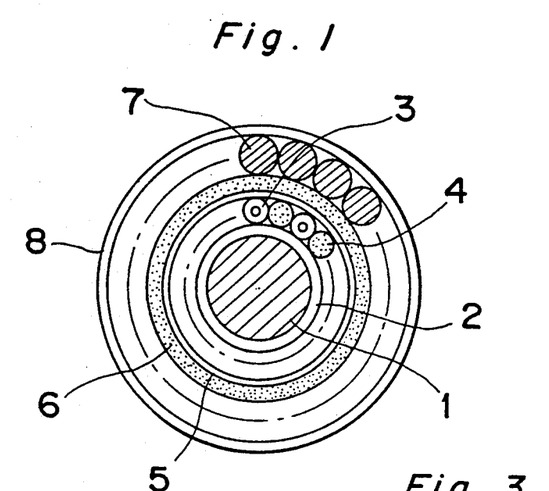
FIG. 1 is a transverse sectional view of an embodiment of an optical-fiber incorporated submarine power cable according to the present invention.

FIG. 1 is a transverse sectional view of a preferred embodiment of an optical-fiber incorporated submarine power cable according to the present invention.

In FIG. 1, reference numeral 1 denotes a power cable core body; 2 indicates a metal sheath such as lead sheath for the power cable; 3 represents an optical fiber unit wound on the periphery of the metal sheath 2 in either sparse or dense winding along with a plastic spacer 4 such as a nylon string spacer, where the plastic spacer 4 may be omitted as only optical fiber unit 3 being wound; and reference numerals 5, 6, 7, and 8 denote a presser winding tape, a plastic sheath of polyethylene and the like, an armoring wire, and a serving layer of polypropylene yarn or the like, respectively.

Figure 2:
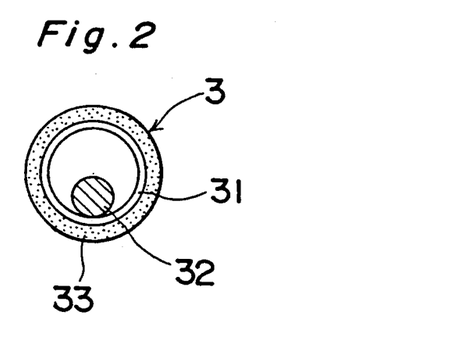
FIG. 2 is a transverse sectional view of an embodiment of an optical fiber unit in the invention.

As shown in FIG. 2, the optical fiber unit 3 is so constructed that the unit has an optical fiber 32 accommodated in a metal pipe 31 of stainless pipe or the like having on its periphery a coating layer made of a material with a higher melting point than that of the above-mentioned polyethylene sheath 6, for example, nylon, polybutene, or polypropylene.

Figure 3:
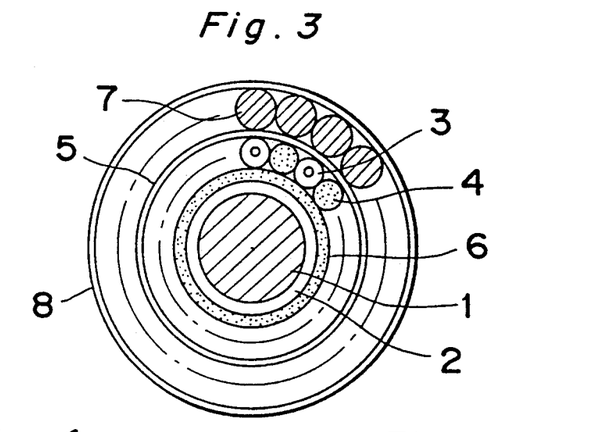
FIG. 3 is a transverse sectional view of another embodiment of the optical-fiber incorporated submarine power cable according to the invention.

FIG. 3 is a transverse sectional view of another embodiment of the optical-fiber incorporated submarine power cable according to the invention. In this embodiment, on the metal sheath 2 on the power cable core there is provided a plastic sheath 6 of polyethylene or the like, and the optical fiber units 3 shown in FIG. 2 are wound either sparsely or densely thereon solely or together with the plastic spacers 4. Further thereon, there are provided a presser winding tape 5, armoring iron wire bundles 7, a serving layer 8, and the like.

Figure 4:
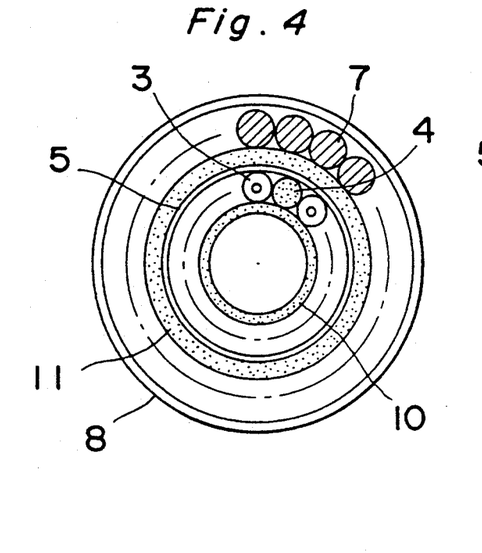
FIGS. 4 and 5 are both transverse sectional views of embodiments of optical-fiber incorporated subaqueous water supply tubes according to the invention.

FIG. 4 is a transverse sectional view of an embodiment of an optical-fiber incorporated submarine water supply tube according to the invention. The water supply tube is constructed in such a manner that optical fiber units 3 are wound sparsely or densely on the periphery of the water supply tube 10 formed of polyethylene pipe or the like together with the plastic spacers 4 made of nylon string as in the aforementioned power cable, and thereon there are provided a presser winding tape 5, plastic sheath 11 of polyethylene or the like and, further thereon, armoring wires 7, serving layer 8, and others.

Figure 5:
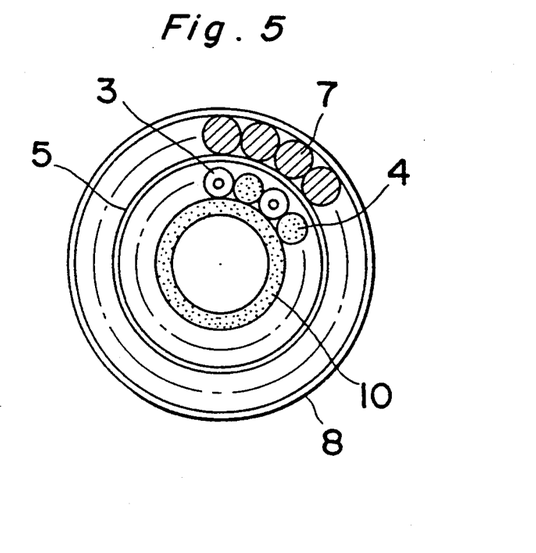

FIG. 5 is a transverse sectional view of another embodiment of an optical-fiber incorporated subaqueous water supply tube according to the invention, wherein the tube differs from that of FIG. 4 in that the outer polyethylene sheath 11 is omitted, while armoring wires 7 are provided on the winding layer of the optical fiber units 3.

Figure 6:
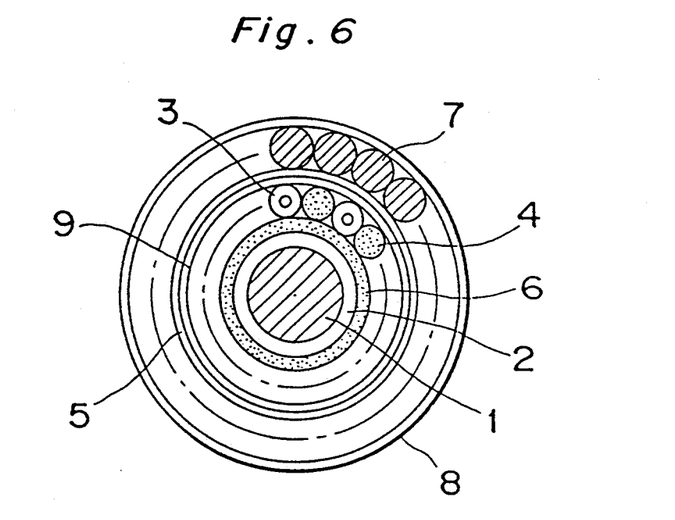
FIG. 6 is a transverse sectional view of a further embodiment of the optical-fiber incorporated submarine power cable according to the invention.
Figure 7A:
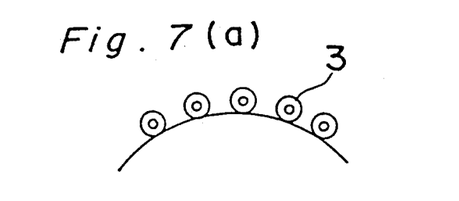
Figure 7B:
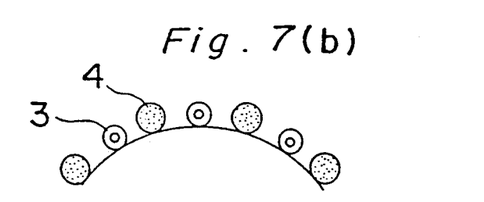
Figure 7C:
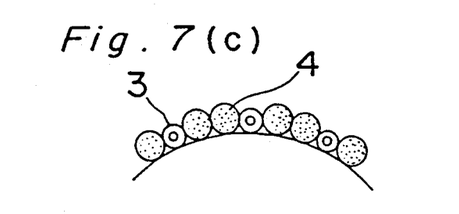
Figure 7D:
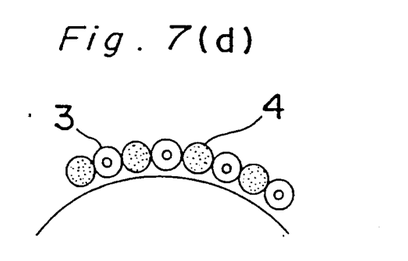

FIG. 6 is a transverse sectional view of a further embodiment of the optical-fiber incorporated submarine power cable according to the invention. This embodiment has the same construction as in the embodiment in FIG. 3 except that on the winding layer of the optical fiber units 3 and plastic spacers 4 there are provided a metal tape layer 9 such as a copper tape, iron tape, or stainless tape.

With submarine power cables, some kinds of surges will come therein: for example, (1) a switch surge is involved when an onshore switch is operated and (2) a thunder impulse is involved when there occurs a thunderbolt to overhead power lines connected at both ends of the submarine power cable (these surge and impulse are hereinafter generically referred to as surges).

When a surge comes into the conductor and metal sheath of the submarine power cable, there may be generated a great potential in the metal substance wound lengthwise on the outside of the cable core. In the case of submarine power cables, these metal substances are normally grounded at their both ends to a zero potential, whereas the longer the cable the proportionally greater the potential, and the farther the cable away from the grounded point the greater the potential there may be developed more likely. With armoring iron wires, they are free of such a great potential owing to being grounded uniformly to sea water. In the case of the optical fiber units according to the present invention, which are corrosion protected with a plastic material to avoid sea-water corrosion, the greater potential may be developed according as the cable is farther away from the grounded points at both ends thereof, as stated above, so that the cables may undergo an electric breakdown due to a great potential exceeding the dielectric strength of the plastic coating layer, resulting in any corrosion in the metal pipe due to internal aggression of sea water or any damage in the optical fiber due to the energy of the electric breakdown.

For these problems, the following countermeasures may be taken:

(1) When optical fiber units 3 are incorporated inside the plastic sheath 6 for the cable, as shown in FIG. 1, both the plastic coating layer 33 for coating the outside of the optical fiber unit 3 and the plastic sheath 6 for the cable are constituted semiconductive in order that a surge induced potential may be dissipated over the entire length of the cable in a sequence of the metal pipe 31 of the optical fiber unit 3—plastic coating layer 33 of the optical fiber unit 3—plastic sheath 6 for the cable—sea water, thus preventing the surge voltage from increasing; and (2) When optical fiber units 3 are incorporated under the armoring wires 7 on the plastic sheath 6 for the cable, as shown in FIG. 3, the plastic coating layer 33 for the optical fiber unit 3 is constituted by semiconductive substance independently of whether the plastic sheath 6 for the cable has semiconductive properties or not, thus allowing the same effect as in the preceding article (1) to be obtained.

To ensure the above effect, as shown in FIG. 6, it is much desirable to provide a metal tape layer 9 on the outside of and in direct contact with the arrangement layer for optical fiber units 3 with the semiconductive plastic coating layer 33 provided, thereby enabling the grounding resistance between the plastic coating layer 33 for the optical fiber unit 3 and sea water to be decreased.

As described heretofore, according to the optical-fiber incorporated longer-sized submarine unit of the present invention, the optical fiber unit can be prevented from any buckling that would occur from bending of the cable or water conveyance tube, thereby enabling a long-life stable performance of the submarine cable unit to be retained.

In a submarine power cable, both the plastic sheath for the cable and the plastic coating layer for the optical fiber unit or only the plastic coating layer for the optical fiber unit may be of a semi-conductive layer so that any abnormal induced potential due to an aggressive surge will be prevented from occurring in the metal pipe of the optical fiber unit, thus allowing the optical fiber to be utilized effectively as it is without being affected by such a potential.

Here can be seen another advantage of this invention in that utilizing an optical fiber unit as mentioned above will make it easy to join optical fibers. This is explained below in detail.

Figure 8:
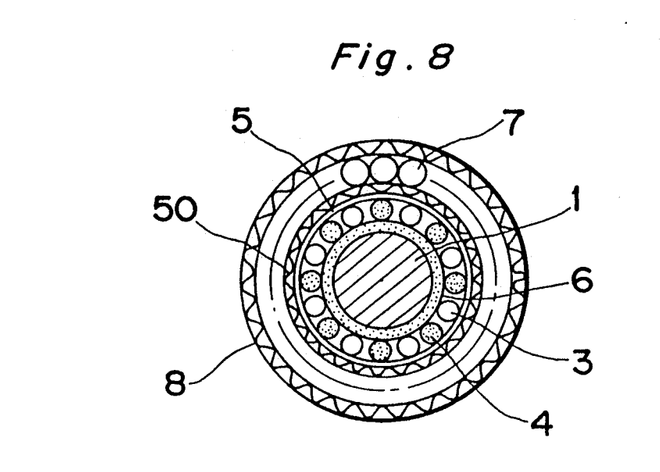
FIG. 8 is a transverse sectional view of an embodiment of an optical-fiber incorporated longer-sized subaqueous unit according to the invention.

In FIG. 8, reference numeral 1 denotes a core body of an optical-fiber incorporated longer-sized subaqueous unit such as a single-core or three-core power cable or a water supply tube, and provided thereon is a plastic sheath 6 of polyethylene, vinyl chloride or the like. On the periphery of the plastic sheath 6 there are wound optical fiber units 3 in the form of spiral, SZ strand, or the like, wherein plastic string spacers 4 of nylon strings, if necessary, are interposed between the optical fiber units 3 to give a dense winding. On the winding layer of the optical fiber units 3 there are provided a presser winding tape 5 and a seat 50 of polypropylene yarn and further provided thereon are armoring iron wire bundles 7 using a lot of iron wires and a corrosion protective layer 8 of polypropylene yarn. In addition, the optical fiber units 3 are of the aforementioned arrangement.

While the plastic string spacer 4 may be of either a round or square type, it is preferably of an outer diameter slightly larger than that of the optical fiber unit 3 so as to prevent the optical fiber unit 3 from being subject to direct external force and should be made of a material similar in quality to or having a higher hardness than the plastic coating layer for the optical fiber unit 3, for example, nylon for the best use.

Such an arrangement of the longer-sized subaqueous unit in which optical fiber units 3 are located on the plastic sheath 6 provided on the periphery of the main body of the longer-sized subaqueous unit enables the optical fibers to be joined independently of any factory joining of longer-sized subaqueous unit main bodies, and further, optical fibers solely to be joined irrespectively of joining excess length, margin, or rejoining from failure. The method of joining need not to be specifically defined.

Now the optical-fiber incorporated longer-sized subaqueous unit including optical fiber units having such a construction as state above is described with regard to its manufacture.

In manufacturing such an optical-fiber incorporated longer-sized subaqueous unit as above, the optical fiber units 3 are incorporated onto the main body 1 of the longer-sized subaqueous unit by means of an armoring wire machine, wherein the winding of optical fiber units 3 and armoring iron wire bundles 7 are carried out in tandem.

Figure 9:
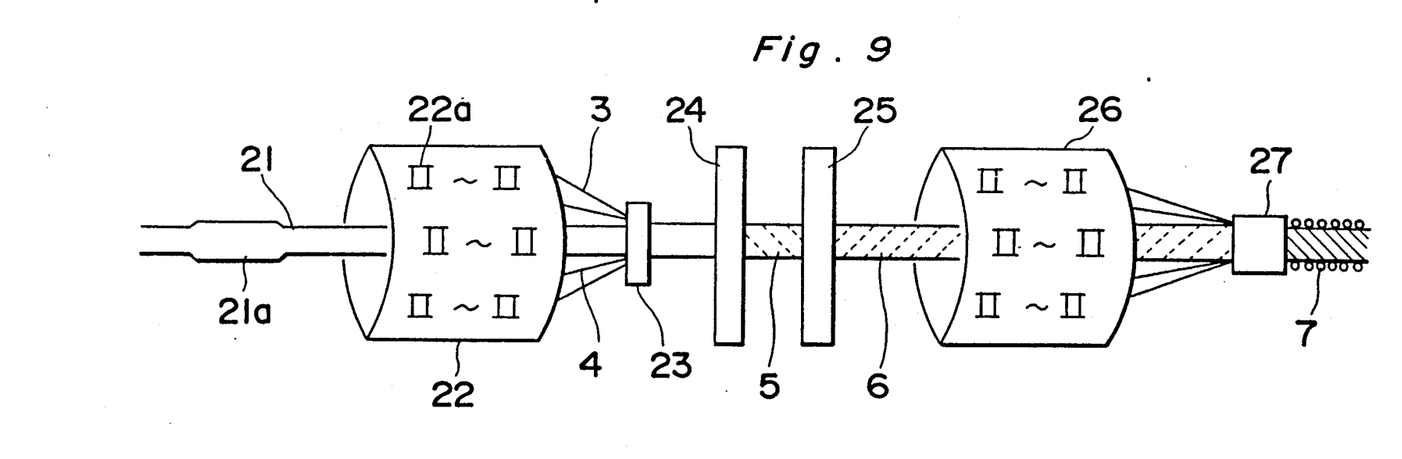
FIG. 9 is a general explanatory view of the manufacturing method for an optical-fiber incorporated longer-sized subaqueous unit according to the invention.

FIG. 9 is a general explanatory view showing an example of manufacturing method for an optical-fiber incorporated longer-sized subaqueous unit.

In FIG. 9, a main body 21 of an optical-fiber incorporated longer-sized subaqueous unit provided with a factory joining portion 21a has a plastic sheath on its periphery. A rotating cage 22 is provided with a bobbin 22a on which an optical fiber unit 3 and a plastic string spacer 4 are wound, the cage being rotated concentrically about the main body 21 of the longer-sized subaqueous unit, thereby having the optical fiber unit 3 and plastic string spacer 4 wound thereon at a pitch of, for example, 6 to 15 times the pitch diameter thereof using a batten plate and die 23. As another way for this step, the optical fiber unit 3 and plastic string spacer 4 may be SZ stranded to be incorporated by SZ rotating the batten plate and die 23 with the supply bobbin 22a fixed. Otherwise, as a further method, with a necessitated number of concentric winding bobbins prepared in place and having the optical fiber units 3 and plastic string spacers 4 wound thereon, the bobbins can be rotated to wind up or SZ strand the optical fiber units 3 and plastic string spacers 4 to be incorporated, where the bobbins used can be larger than the rotating cage shown in FIG. 9, rendering longer the length of a series of the optical fiber unit 3 and spacer 4.

Then, with the optical fiber units 3 and spacers 4 thus incorporated onto the main body 21 of the longer-sized subaqueous unit, the presser winding tape 5 and seat 6 are provided using a tape winding device 23 and a polypropylene yarn winding device 24, and moreover armoring iron wires 7 are provided using an iron wire cage 26 and the die 27.

By incorporating the optical fiber unit 3 and plastic string spacer 4 onto the longer-sized subaqueous unit as shown above, the longer-sized subaqueous unit main body 1 can be joined with another in an ordinary manner independently. Furthermore, the optical fiber unit 3 and spacer 4 can be also joined with other ones at discretion independently of the main body core 1, so that the required joining excess length thereof may be properly treated by releasing or rewinding the relevant bobbin having them wound on, thus eliminating the need of accommodating the marginal optical fiber units as conventionally, with a substantially great effect. This is of course also effective even if any larger diameter is involved in factory joining portions in the longer-sized subaqueous unit, by enabling the optical fiber unit and spacer to be naturally wound thereon.

It is further effective to have the optical fiber units 3 and spacers 4 in dense winding and make the outer diameter of the spacer (or the height for a square type) slightly larger than that of the optical fiber unit 3 (for example, a diameter of 3.0 mm for the optical fiber unit 3 and that of 3.5 mm for the spacer), thereby preventing the optical fiber unit 3 from being damaged by winding external force from the armoring wires or lateral pressure in passing through a sheave or the like.

With the arrangement as described above, any type of optical-fiber incorporated longer-sized subaqueous unit can be easily manufactured without any trouble in joining optical fibers.

As shown heretofore, according to the optical-fiber incorporated longer-sized subaqueous unit of the present invention, the longer-sized subaqueous unit can be manufactured independently of joining the optical fibers and the main body of the longer-sized subaqueous unit.

Further in this arrangement, the optical fiber units can be incorporated into the longer-sized subaqueous unit in tandem with the armoring wires, thereby excluding any addition of incorporating processes.

Next, described below is an optical fiber unit such as stated above having a high-melting-point material, for example, nylon coated on the outside of a metal pipe in which optical fiber units are accommodated, wherein the optical fiber unit has been devised so as to prevent any reduction in the transmission loss of the optical fiber that would be involved in coating the above high-melting-point material.

With an optical fiber unit mentioned above, since the metal pipe 31 having the optical fiber 32 accommodated therein is an approximately 1 mm in diameter and therefore extremely low in heat capacity, when the metal pipe is coated by extrusion with nylon or the like, the optical fiber 32 will be subject to a temperature increase up to the plastic extrusion temperature immediately after its extrusion. In the case of nylon, for example, it is required to extrude the coating material at a temperature of around 230° to 300° C., far higher than that of polyethylene. From the results of experiments, it was found that there are some cases where these materials extrusion coated can heat affect the accommodated optical fiber 32 itself, causing some optical fibers to be increased in their transmission loss. An embodiment shown below is to provide an optical fiber unit which has solved the above problems with the characteristics of the high-melting-point material such as nylon still alive, characterized in that on the outside of the metal pipe having optical fibers accommodated therein, there is provided a coating layer of a plastic material having a higher melting point than polyethylene with a heat insulating layer interposed therebetween.

Figure 10:
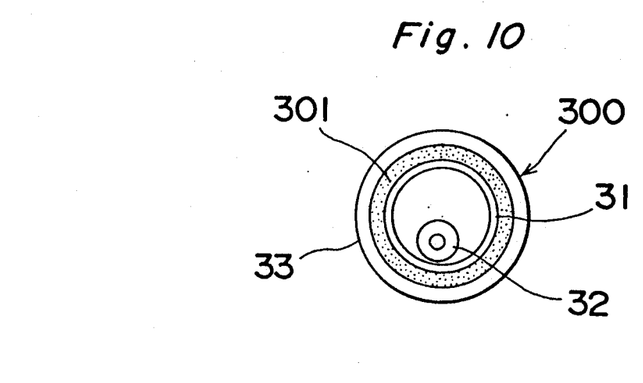
FIG. 10 is a transverse sectional view of an embodiment of an optical fiber unit according to the invention.

FIG. 10 is a transverse sectional view of an embodiment of an optical fiber unit according to the invention.

In FIG. 10, a metal pipe 31 made of stainless or the like has an optical fiber 32 accommodated therein, and on the periphery of the metal pipe 31 there is provided a heat insulating layer 301, with a coating layer 33 made of a plastic material such as polypropylene, polybutene, or nylon, having a higher melting point than polyethylene, wherein jelly may be charged in the metal pipe 31 as required.

For the heat insulating layer 301, a plastic material is used which has a melting point lower than that of polyethylene, foaming polyethylene, polyvinyl chloride or the like.

In the case where foaming polyethylene is used as the heat insulating layer, in extruding the coating layer 33 outside thereof, a sufficient evacuation is to be performed immediately before the insertion into the crosshead of the extruding machine, thereby not only increasing the effect of the heat insulating layer but also preventing blisters from occurring in the coating layer due to air blow expansion in the heat insulating layer 301 during the extrusion of the coating layer 33.

When the coating layer 33 is extruded onto the heat insulating layer 301, the core coated up to the heat insulating layer 301 is to be sufficiently cooled immediately before the insertion into the crosshead. On the other hand, the cooling immediately after the extrusion of the coating layer 33 is to be performed using cooling water or such that a coolant having been cooled through a cooler is made use of for an instantaneous cooling immediately after the extrusion so that the extrusion temperature of the coating layer 33 may not affect the optical fiber.

In addition, the thickness of the heat insulating layer 301 is to be not more than 1 mm and the thickness of the coating layer 33 applied thereon is to be approximately 1.5 to 3 mm.

As described above, according to the optical fiber unit of the present invention, the optical fiber unit is provided with a coating layer made of a plastic material having a higher melting point than polyethylene on the outside of the metal pipe having optical fibers accommodated therein through a heat insulating layer interposed therebetween, so that the optical fibers accommodated in the metal pipe will not be affected by the extrusion temperature of the coating layer.

Since the optical fiber unit is provided on its outside with a coating layer made of plastic material having a melting point higher than that of polyethylene, such an optical fiber unit is not affected by the extrusion temperature of polyethylene even if it is combined with a power cable, plastic water conveyance tube, or the like in the form of winding or SZ strand with a polyethylene sheath provided thereon.

The optical fiber unit is therefore extremely effective when utilized for optical-fiber incorporated power cables, optical-fiber incorporated water conveyance tubes or the like.

Meanwhile, even in a submarine cable provided with optical fiber units having a coating material such as nylon, or further having a heat insulating material, there is a possibility that, as in a conventional submarine cable, its serving layer 8 is subject to immersion of sea water so that the metal pipe 31 of the optical fiber unit may come in contact with sea water microscopically. In such a case, if the contact is made over the entire metal pipe uniformly and moreover water content involved is in the state of particulates, there arises no problem, while if the metal pipe includes some regions in which the contact is locally made and others in which no contact is made, or if the metal pipe is in contact with sea water in varied volumes thereof, with the result that, for example, sea water exists locally as water droplets, there arises a problem that so-called crevice corrosion occurs locally.

To solve these problems, anticorrosion paint can be applied to crevices that may occur between the plastic coating layer 33 and metal pipe 31 in the optical fiber unit. For this purpose, a rust-preventive paint can be applied thereto which is composed of tar-related, petroleum-related, or their mixed material, such as normally applied to the underside of an anticorrosion layer of the power cable. In the case where the anticorrosion layer is of an electrically conductive material, the paint used is preferably also of a conductive material.

What is claimed is:

1. An optical fiber incorporated subaqueous cable comprising:
   a core body;
   a plastic sheath surrounding a periphery of the core body;
   a plurality of optical fiber units wound on a periphery of the plastic sheath, each optical fiber unit comprising:
   a stainless steel tube;
   a single optical fiber enclosed within the stainless steel tube; and
   a layer of plastic surrounding the stainless steel tube; and
   a plurality of armoring iron wire bundles surrounding the plurality of optical fiber units wound on a periphery of the plastic sheath.

2. An optical fiber incorporated subaqueous cable as in claim 1, wherein the core body comprises a power cable and the plastic layer surrounding the stainless steel tube is of an electrically semiconductive material.

3. An optical fiber incorporated subaqueous cable as in claim 2, further comprising a layer of electrically conductive anticorrosive compound applied directly to an outer surface of the stainless steel tube, the anticorrosive compound being surrounded by the electrically semiconductive plastic layer.

4. An optical fiber incorporated subaqueous cable as in claim 1 further comprising spacer units located between optical fiber units wound on the plastic sheath.

5. An optical fiber incorporated subaqueous cable as in claim 4 wherein the spacer units have a diameter larger than a diameter of the optical fiber units.

6. An optical fiber incorporated subaqueous cable comprising:
   a core body;
   a plurality of optical fiber units disposed in a periphery of the core body, each optical fiber unit comprising:
   a stainless steel tube;
   a single optical fiber enclosed within the stainless steel tube; and
   a layer of plastic material on an outer periphery of the stainless steel tube;
   a plastic sheath surrounding the plurality of optical fiber units, the layer of plastic material on the stainless steel tube having a higher melting temperature than that of the material of the plastic sheath; and
   a plurality of armoring iron wire bundles surrounding an outside of the plastic sheath.

7. An optical fiber incorporated subaqueous cable as in claim 6, wherein the core body comprises a power cable and the plastic layer surrounding the stainless steel tube is of an electrically semiconductive material.

8. An optical fiber incorporated subaqueous cable as in claim 6, further comprising a layer of electrically conductive anticorrosive compound applied directly to an outer surface of the stainless steel tube, the electrically conductive anticorrosive compound layer being surrounded by the electrically semiconductive plastic layer.

9. An optical fiber incorporated subaqueous cable as in claim 6, further comprising an insulation layer applied directly to an outer surface of the stainless steel tube, the insulation layer being surrounded by the layer of plastic.

10. An optical fiber incorporated subaqueous cable as in claim 6, wherein the plastic sheath and the layer of plastic on the stainless steel tube are both of electrically semiconductive materials.

11. An optical fiber incorporated subaqueous cable as in claim 10, further comprising a layer of electrically conductive anticorrosive compound applied directly to an outer surface of the stainless steel tube, the electrically conductive anticorrosive compound layer being surrounded by the electrically semiconductive plastic layer.

12. An optical fiber incorporated subaqueous cable as in claim 6, further comprising spacer units located between optical fiber units wound on the plastic sheath.

13. An optical fiber incorporated subaqueous cable as in claim 12, wherein the spacer units have a diameter larger than a diameter of the optical fiber units.

14. An optical fiber incorporated subaqueous cable comprising:
    a core body;
    a plurality of optical fiber units wound on an outside of the core body, each optical fiber unit comprising:
    a stainless steel tube;
    a single optical fiber enclosed within the stainless steel tube; and
    a layer of plastic surrounding the stainless steel tube;
    a plastic sheath surrounding the plurality of optical fiber units wound on a periphery of the core body; and
    a plurality of armory iron wire bundles surrounding the plastic sheath.

15. An optical fiber incorporated subaqueous cable as in claim 14, wherein the layer of plastic surrounding the stainless steel tube has a higher melting temperature than that of the plastic sheath.

16. An optical fiber incorporated subaqueous cable as in claim 14, further comprising an insulation layer applied directly to an outer surface of the stainless steel tube, the insulation layer being surrounded by the layer of plastic.

17. An optical fiber incorporated subaqueous cable as in claim 16, wherein the plastic sheath and the layer of plastic on the stainless steel tube are both of electrically semiconductive materials.

18. An optical fiber incorporated subaqueous cable as in claim 14, wherein the core body comprises a power cable made of copper or aluminum.

19. An optical fiber incorporated subaqueous cable comprising:
    a core body of an electric power cable or a fluid supply pipe;
    a plastic sheath surrounding a periphery of said core body;

a plurality of optical fiber units wound on a periphery of said plastic sheath, each optical fiber unit comprising:
a stainless steel tube;
a single optical fiber enclosed within the stainless steel tube; and
a layer of plastic surrounding the stainless steel tube; and
a plurality of armoring iron wire bundles surrounding the plurality of optical fiber units wound on a periphery of the plastic sheath.

20. An optical fiber incorporated subaqueous cable as in claim 19, wherein the plastic layer surrounding the stainless steel tube is of an electrically semiconductive material.

21. An optical fiber incorporated subaqueous cable as in claim 20, further comprising a layer of electrically conductive anticorrosive compound applied directly to an outer surface of the stainless steel tube, the electrically conductive anticorrosive compound layer being surrounded by the electrically semiconductive plastic layer.

22. An optical fiber incorporated subaqueous cable comprising:
a core body;
a plastic sheath surrounding a periphery of the core body;
a plurality of optical fiber units wound on a periphery of the plastic sheath, each optical fiber unit comprising:
a metal tube having an outer diameter of about 1 to 2 mm;
a single optical fiber enclosed within the stainless steel fiber; and
a layer of plastic surrounding the stainless steel tube, the layer of plastic having a thickness of about 0.5 to 1.0 mm; and
a plurality of armoring wire bundles surrounding the plurality of optical fiber units wound on a periphery of the plastic sheath.

* * * * *